(12) United States Patent
Yu

(10) Patent No.: US 8,745,270 B2
(45) Date of Patent: Jun. 3, 2014

(54) COMMUNICATION DEVICE AND METHOD OF HANDLING LARGE OBJECT IN DEVICE MANAGEMENT

(75) Inventor: Chun-Ta Yu, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 343 days.

(21) Appl. No.: 13/082,060

(22) Filed: Apr. 7, 2011

(65) Prior Publication Data

US 2011/0250878 A1 Oct. 13, 2011

Related U.S. Application Data

(60) Provisional application No. 61/322,089, filed on Apr. 8, 2010.

(51) Int. Cl.
*G06F 15/16* (2006.01)

(52) U.S. Cl.
USPC .......................................... 709/246; 709/230

(58) Field of Classification Search
USPC .................. 709/246, 230; 455/419, 422.1
See application file for complete search history.

(56) References Cited

U.S. PATENT DOCUMENTS

| 6,085,251 | A | 7/2000 | Fabozzi | |
|---|---|---|---|---|
| 6,192,412 | B1* | 2/2001 | Cantoral et al. | 709/236 |
| 2004/0267831 | A1* | 12/2004 | Wong et al. | 707/200 |
| 2007/0198731 | A1* | 8/2007 | Li et al. | 709/230 |
| 2007/0288484 | A1* | 12/2007 | Yan et al. | 707/10 |
| 2009/0044185 | A1* | 2/2009 | Krivopaltsev | 717/173 |

FOREIGN PATENT DOCUMENTS

| CN | 101026788 A | 8/2007 |
|---|---|---|
| CN | 101534478 A | 9/2009 |

OTHER PUBLICATIONS

"OMA Device Management Protocol"; Draft Version 1.3—Mar. 15, 2010; Open Mobile Alliance; OMA-TS-DM_Protocol-V1_3-20100315-D; pp. 1-54.*
Lakshmeshwar et al., "Suspend and resume feature for OMA DM large object delivery," The 3rd International Conference on Grid and Pervasive Computing—Workshops, IEEE Computer Society, May 2008, pp. 206-212.*
"OMA Device Management Representation Protocol"; Draft Version 1.3—Feb. 11, 2010; Open Mobile Alliance; OMA-TS-DM_RepPro-V1_3-20100211-D; pp. 1-77.
"OMA Device Management Tree and Description," Approved Version 1.2.1, Jun. 17, 2008, OMA-TS-DM_TND-V1_2_1-2080617-A, pp. 1-48.

(Continued)

*Primary Examiner* — Michael C Lai
(74) *Attorney, Agent, or Firm* — Birch, Stewart, Kolasch & Birch, LLP

(57) ABSTRACT

Communication devices and methods thereof. The communication device comprises a communication module, a memory module, and a control module. The communication module receives a data object exceeding a predetermined data size from a device management server. The memory module, coupled to the communication module, comprises a management object tree having a management object leaf node, storing a first portion of the received data object in the management object leaf node, and holds the first portion in the management object leaf node when termination of the reception of the data object is being determined. The control module, coupled to the communication module and the memory module, determines termination of the reception of the data object prior to the data object being completely received, wherein the first portion comprises at least one unit data, and each unit data has a data size less than or equal to the predetermined data size.

14 Claims, 3 Drawing Sheets

(56) References Cited

OTHER PUBLICATIONS

"OMA DS Protocol," Approved Version 1.2.2, Mar. 19, 2009, Open Mobile Alliance, OMA-TS-DS_Protocol-V1_2_2-20090319-A, pp. 1-96.

Lakshmeshwar et al., "Suspend and resume feature for OMA DM large object delivery," The 3rd International Conference on Grid and Pervasive Computing—Workshops, IEEE Computer Society, pp. 206-212, May 2008.

* cited by examiner

COMMUNICATION DEVICE AND METHOD OF HANDLING LARGE OBJECT IN DEVICE MANAGEMENT

This application claims the benefit of U.S. Provisional Application No. 61/322,089, filed Apr. 8, 2010, the entirety of which is incorporated by reference herein.

BACKGROUND OF THE INVENTION

1. Field of the Invention

The disclosure relates generally to device management, and, more particularly to a communication device and method of large object handling in the device management.

2. Description of the Related Art

The device management (DM) specification is used to manage telecommunication devices such as mobile phones, PDAs and palm top computers, so that the telecommunication devices are instructed by a remote DM server to accomplish functions such as device configuration, software installation and upgrade, and error diagnosis.

In the DM specifications specified by the Open Mobile Alliance DM (OMA DM), a DM client at the telecommunication device is adapted to receive Management Objects (MO) and execute a management command delivered by the DM server. A management object tree on the telecommunication device may be regarded as an interface that the DM server uses to manage the telecommunication device through a DM protocol. A group of management objects exist in the MO tree. The DM server manages device resources through an operation on a node in the MO tree.

A management object with a data size exceeding that of a DM message is referred to as a large object in the DM specification. The handling of the large object in the DM specification is inefficient, as when a transmission process of the large object is disrupted in midstream, the DM protocol specifies that the DM server has to deliver the entire large object to the telecommunication device.

Thus a communication device and method of handling the large object in the DM specification to increase utilization of transmission resources are in need.

BRIEF SUMMARY OF THE INVENTION

A method is disclosed, comprising a telecommunication device receiving a data object exceeding a predetermined data size from a device management server, storing the received data object as a first portion in a management object leaf node, determining termination of the reception of the data object prior to the management object being completely received, and holding the first portion in the management object leaf node after termination has been determined, wherein the first portion comprises at least one unit data, and each unit data has a data size less than or equal to the predetermined data size.

Another communication device is provided, comprising a communication module, a memory module, and a control module. The communication module receives a data object exceeding a predetermined data size from a device management server. The memory module, coupled to the communication module, comprises a management object tree having a management object leaf node, stores a first portion of the received data object in the management object leaf node, and holds the first portion in the management object leaf node when termination of the reception of the data object is being determined. The control module, coupled to the communication module and the memory module, determines termination of the reception of the data object prior to the data object being completely received, wherein the first portion comprises at least one unit data, and each unit data has a data size less than or equal to the predetermined data size.

Still another method of a communication device is described, comprising a communication device: receiving a first data and a first data number from a device management server to be saved in a management object leaf node in the communication device, receiving an INSERT command or a command including an INSERT element comprising a second data and a second data number from the device management server, saving the second data and the second data number in the management object leaf node in the communication device, and combining the first and the second data according to the first and the second data numbers, wherein the first and second data numbers indicate an order to combine the first and the second data.

Yet another communication device is provided, comprising a communication module, a memory module, and a control module. The communication module receives a first data and a first data number from a device management server, and receives an INSERT command or a command including an INSERT element comprising a second data and a second data number from the device management server. The memory module, coupled to the communication module, saves the first data and the first data number in a management object leaf node in the communication device, and saves the second data and the second data number in the management object leaf node. The control module, coupled to the communication module and the memory module, combines the first and the second data according to the first and the second data numbers, wherein the first and second data numbers indicate an order to combine the first and the second data.

BRIEF DESCRIPTION OF THE DRAWINGS

The invention will become more fully understood by referring to the following detailed description with reference to the accompanying drawings, wherein.

DETAILED DESCRIPTION OF THE INVENTION

Figure 1:
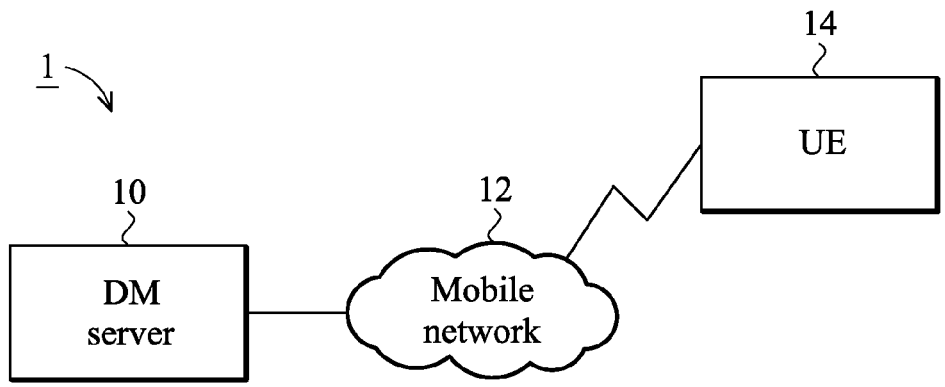
FIG. 1 is a block diagram of an exemplary wireless network system 1 incorporating device management.

The DM protocol can be implemented on wired or wireless media, and supports a transport layer implementing Wireless Application Protocol (WAP), Hypertext Transfer Protocol (HTTP), or Object Exchange (OBEX) protocols. FIG. 1 is a block diagram of an exemplary wireless network system 1 incorporating device management, comprising a DM server 10, a mobile network 12, and a user equipment (UE) 14. The DM server 10 is coupled to the mobile network 12, and subsequently to the UE 14 via a radio frequency channel. The DM server 10 may be a network server or a computer acting as a server. The mobile network 12 may be a first, second or third generation network such as a Global System for Mobile Communications (GSM), Universal Mobile Telecommunications System (UMTS), Wireless Local Area Network (WLAN), or a combination thereof. The UE 14 may be any device used directly by an end-user for communications, e.g., handhold mobile phones, laptops equipped with broadband network adaptors, or any other device capable of communications.

The DM server 10 performs device configuration, software installation or upgrades, and error diagnosis to a DM client (not shown) on the UE 14 according to the DM protocol. In the UE 14, the data to be managed are arranged as management objects (MO), and are manageable by the DM server 10 by DM commands. The management object is the data entity in the DM protocol that cannot be further divided and utilized separately. The property of the indivisibility of the management objects is referred to as 'atomic'. Conventionally, the large object handling mechanism are compliant with the atomic rule.

Upon establishing a DM connection between the DM server 10 and the UE 14, the UE 14 sets up a management object (MO) tree to hold management objects. The management objects can be added to the MO tree from the DM server 10 or the client device 14. Data communication in the DM protocol is transmitted in DM messages with data sizes less than or equal to a predetermined data size. The predetermined data size may be negotiated between the DM server 10 and the UE 14 by MaxObjSize information in meta information of a DM message header SyncHdr during DM session establishment, and remains in effect throughout the DM session unless a new value for the MaxObjSize information is updated. When the MaxObjSize information is not provided in the DM session, the DM messages can have any data size. The management object with a data size exceeding the predetermined data size of a DM message is referred to as a Large Object. The large object is required to be split into DM messages compliant with the predetermined data size before being transmitted in the DM session. Except for the last DM message, a <MoreData/> element is included in the DM messages of the large object to inform the receiver that the management object is incomplete and more DM messages are to come to complete the large object. For example, the MaxObjSize information is 512 k and a large object of 1M data size is required to be split into two DM messages with 512 k data size for transmission. The first DM message comprises the <MoreData/> information indicating that a second DM message is to be transmitted, and the second DM message contains no <MoreData/> information to represent that it is the last message. The DM messages constituting the large object are stored in a leaf node in the MO tree upon receipt, and are reconstructed and used by the receiver only when the large object is completely received. The DM messages comprise a <Size> element in the meta information to indicate an object size of the large object. When a data size of the completely received large object does not match with the object size in the <Size> element, the UE 14 sends a message 424 "size mismatch" to inform the DM server 10 of the error condition. When receiving a new data object or DM command from the DM server 10 before the large object is completely retrieved, the UE 14 responds with an Alert 1225 "End of Data for chunked object not received" to the DM server 10. When the error 424 "size mismatch" error or the Alert 1225 "End of Data for chunked object not received" occurs, the UE 14 determines to terminate the large object transmission. If the data transmission is disconnected or terminated prior to the management object being completely received, the UE 14 must discard the received DM messages that constitute the large object, and the entire large object has to be retransmitted.

Figure 2:
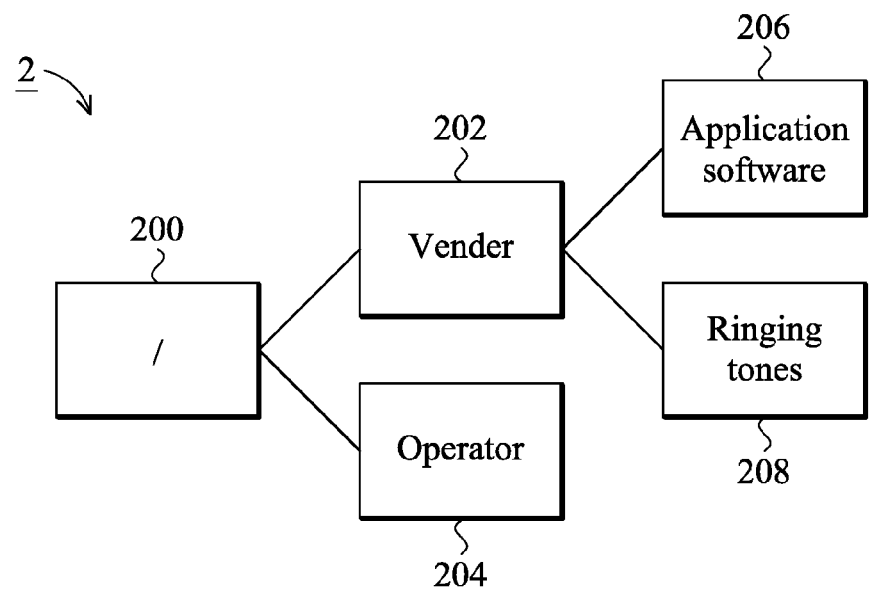
FIG. 2 is an exemplary management tree use in device management.

The management object may be an integer or a large entity, such as application software or a screensaver. Examples of the management objects in the OMA DM protocol include a Software Component Management Object (SCOMO) and Firmware Update Management Object (FUMO), where the SCOMO performs software management on a remote device, including installation, uninstallation, activation and deactivation of software components, and the FUMO allows mobile devices to be updated over-the-air by operators and device manufacturers using the industry-standard protocol OMA DM. In SCOMO device management, the management objects are arranged in a management object tree 2, as depicted in a FIG. 2. The MO tree 2 comprises a root node 200, internal nodes 202 and 204, and leaf nodes 206 and 208. The management object may be a single parameter or collected data. The root node 202 is the topmost node of the MO tree 2, which branches into the internal node 202 comprising a management object 'Vendor' and the internal node 204 comprising a management object 'Operator'. Each internal node may further couple to leaf nodes to hold management objects. For example, the management object 'Vendor' comprises leaf nodes 'Application Software' and 'Ringing Tones'. The management object 'Application Software' is a leaf object including an application software downloaded from the DM server 10, and the management object 'Ringing Tones' contains a ringing tone data. Each management object can be addressed using a Uniform Resource Identifier (URI) originating at the root node '/' and moving downwards along the MO tree 2, wherein each management object has a unique name appended to an immediate preceding one by a backslash '/' as the delimiting character. For example, the management object 'Application Software' can be addressed using the URI '/Vendor/'Application Software'. When a large object of the application software is requested by the UE 14, the DM server 10 transmits the requested application software by the DM messages to the UE 14 to be stored in the leaf node 208. The UE 14 assembles the received DM messages in the leaf node 208 upon completion of the application software transmission. Conventionally, if the transmission is terminated or disconnected prior to completion, the UE 14 discards the received DM messages and empties the leaf node 208, to prepare the storage space for accepting the retransmitted application software.

Figure 3:
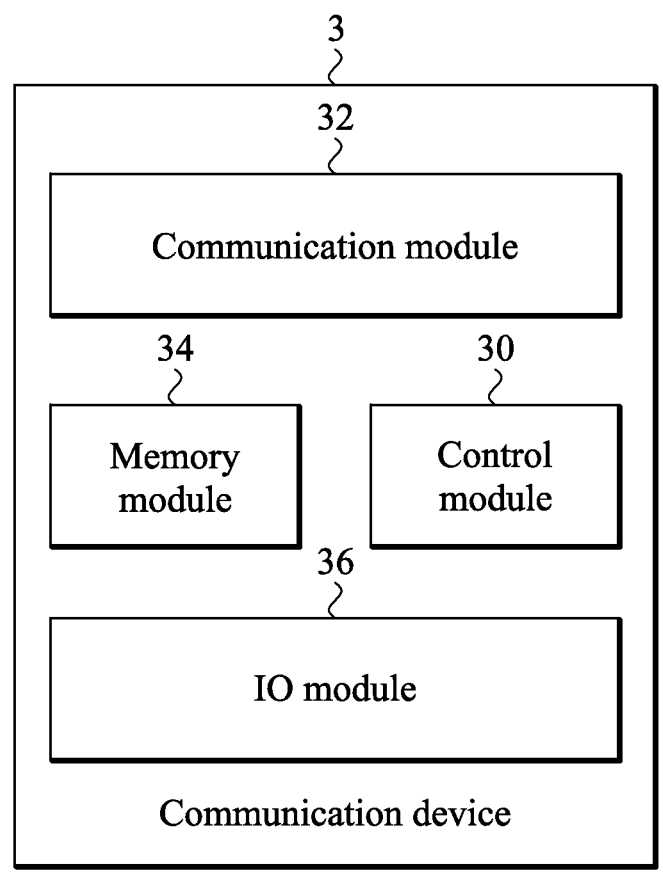
FIG. 3 is a block diagram of an exemplary communication device 3 according to the invention.

FIG. 3 is a block diagram of an exemplary communication device 3 according to the invention, incorporated in the wireless network system 1 as the UE 14. The communication device 3 comprises a control module 30, a communication module 32, a memory module 34, and an IO module 36. The communication module 32, the memory module 34, and the IO module 36 are coupled to the control module 30.

The control module 30 comprises hardware to control operations of the communication module 32, the memory module 34, and the IO module 36, and perform baseband signal processing including digital signal processing, coding and decoding, and so on.

The communication module 32 comprises hardware to perform analog to digital conversion (ADC), digital to analog conversion (DAC), gain adjusting, modulation, demodulation, and so on. The communication module 32 receives the RF signals that carry the DM messages from a DM server (not shown) and down-converts the received RF wireless signals to baseband signals to be processed by the control module 30, or up-converts baseband signals from the control module 30 to RF wireless signals for uplink transmission. The communication module 32 may comprise a mixer to up-convert the baseband signals with a component carrier signal oscillated at a radio frequency of the wireless communications system. The radio frequency may be 900 MHz, 1900 MHz, or 2100 MHz utilized in WCDMA systems, or may be 900 MHz, 2100

MHz, or 2.6 GHz utilized in LTE systems, or others depending on the radio access technology (RAT) in use.

Upon establishment of a DM session, the control module 30 sets up a management object tree in the memory module 34. The memory module 34 may be magnetic disk storage or any other medium which can be used to store digital data accessible by a general purpose or special purpose computer. Prior to transmitting a large data object, the DM server sends an ADD command to add a management object leaf node to the MO tree to provide storage of the large data object. Then the communication module 32 receives the large data object exceeding a predetermined data size from a device management server. The predetermined data size is the MaxObjSize information received at the DM session startup. The management object leaf node stores a first portion of the received data object, and holds the first portion when termination of the reception of the data object is being determined. When the connection to the DM server is disconnected, the error 424 "size mismatch" is detected, or the Alert 1225 "End of Data for chunked object not received" occurs, such that the control module 30 determines to terminate the reception of the data object. The first portion comprises at least one DM message (unit data) with a data size of the predetermined data size.

Each DM message comprises a data number indicating an order thereof in the data object, and the memory module 34 saves the data number of each unit data of the first portion. In one embodiment, the memory module 34 only stores the DM messages in a consecutive order and records each data size thereof. After data reception is terminated, the DM server sends a GET command to get the data size of the first portion in the MO leaf node in the memory module 34. After receiving the GET command, the communication module 32 transmits the data sizes of each DM messages constituting the first portion to the DM server, which then determines the remaining DM messages to be sent according to the data sizes of the first portion and resumes transmission. For example, the DM server transmits a large data object comprising 10 DM messages to the communication device 3, after transmitting the $1^{st}$, $2^{nd}$, and $3^{rd}$ DM messages the connection therebetween is broken while transmitting the $4^{th}$ DM message. The memory module 34 holds the first three consecutive DM messages after termination of the connection. Next the DM server sends the GET command to get the data sizes of the $1^{st}$, $2^{nd}$, and $3^{rd}$ DM messages from the communication device 3, determines that the $4^{th}$ to the $10^{th}$ DM messages are the remaining DM messages that have yet to be transmitted according to the received data sizes, and resumes the transmission of the $4^{th}$ to the $10^{th}$ DM messages to the communication device 3. In another embodiment, the DM server keeps a record of the data sizes of the transmitted DM messages, and resumes the transmission of the remaining messages accordingly after termination of the incomplete large object transmission. In still another embodiment, the memory module 34 stores all received DM messages and records the data numbers thereof. When data reception is terminated, the DM server sends a GET command to get each data number of the first portion in the MO leaf node in the memory module 34. After receiving the GET command, the communication module 32 transmits the data number of each received DM message to the DM server, which in turn determines the remaining DM messages according to the received data numbers and resumes transmission. For example, the DM server transmits the large data object comprising 10 DM messages to the communication device 3, and after transmitting the $1^{st}$, $2^{nd}$, $3^{rd}$, $5^{th}$, and $8^{th}$ DM messages, the connection therebetween is broken while sending the $4^{th}$ DM message. The memory module 34 holds the $1^{st}$, $2^{nd}$, $3^{rd}$, $5^{th}$, and $8^{th}$ DM messages after termination of the connection. Then the DM server sends the GET command to get the data numbers of the $1^{st}$, $2^{nd}$, $3^{rd}$, $5^{th}$, and $8^{th}$ DM messages from the communication device 3, determines that the $4^{th}$, $6^{th}$, $7^{th}$, $9^{th}$ and $10^{th}$ DM messages are the remaining DM messages that have yet to be transmitted, and resumes the transmission of the remaining messages to the communication device 3.

The communication module 32 receives the remaining DM messages as a second portion of the data object from the device management server. The memory module then stores the second portion in the management object leaf node. The DM server may transmit an INSERT command comprising the second portion of the large data object to resume the data transmission. The INSERT command requests for appending a data, or inserting a data in the beginning, middle, or end of a data object in the leaf node at the MO tree. Alternatively, the DM server may transmit a command including an INSERT element, instead of the INSERT command. The INSERT element can be a tag which indicates the command requests for appending a data, or inserting a data in the beginning, middle, or end of a data object in the leaf node at the MO tree. The communication module 32 receives the INSERT command (or the command including the INSERT element) to store the second portion in the management object leaf node. The control module 30 combines the first and the second portions in the leaf node to generate the large object upon completion of the data reception for the large object. The control module 30 may further process or execute the large object according to a DM command from the DM server. For example, the large object is a ring tone, and the control module 30 can process the ring tone data to be played back through the IO module 36, which may comprise a speaker, a display, a touch screen, a keyboard, or any input or output means on the communication device 3.

The communication device 3 is provided with the flexibility of resuming data transmission following the termination of connections, thereby reducing data transmission time for device management.

Figure 4:
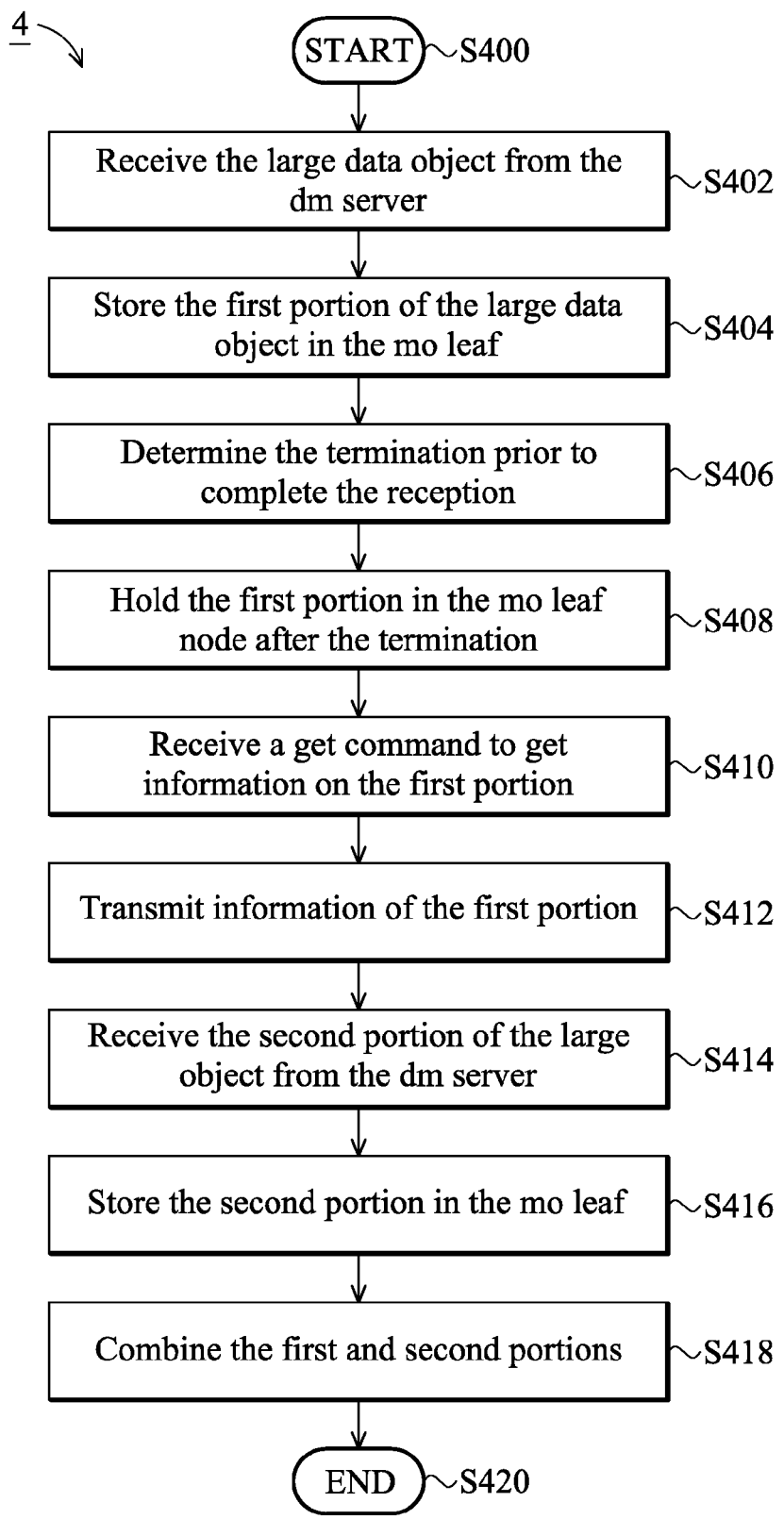
FIG. 4 is a flowchart of an exemplary method 4 of the communication device 3 according to the invention.

FIG. 4 is a flowchart of an exemplary method 4 of the communication device 3 according to the invention.

In step S400, the communication device 3 is initiated to perform the telecommunication method 4 to receive the large data object in a DM session, including setting up the MO tree and the leaf nodes to store the large data object.

In step S402, the communication device 3 receives the large data object from the DM server. The data size of the large object exceeds the predetermined data size defined in the MaxObjSize information during the DM session startup, thus the DM server divides the large object into data segments to be transmitted in DM messages, wherein the sizes thereof are less than the predetermined data size.

In step S404, the communication device 3 stores the first portion of the large data object in the MO leaf node. In one embodiment, the communication device 3 stores the DM messages in a consecutive order and records each data size thereof. In another embodiment, the communication device 3 stores the DM messages in a consecutive order and the DM server keeps a record of the data sizes of the transmitted DM messages. In yet another embodiment, the communication device 3 stores all received DM messages and records the data numbers thereof.

In step S406, the communication device 3 determines termination of the reception prior to completing reception of the data.

In step S408, the communication device 3 holds the first portion in the MO leaf node after the termination. When the connection to the DM server is disconnected from the communication device 3, the error 424 "size mismatch" is detected, or the Alert 1225 "End of Data for chunked object not received" occurs, and the communication device 3 determines termination of the reception of the data object. Each DM message comprises a data number indicating an order thereof in the data object.

In step S410, the communication device 3 receives a GET command from the DM server to get information on the first portion. In one embodiment, the GET command is to get the data size information of each DM message in the first portion. In another embodiment, the GET command is to get the data number information of each DM message in the first portion.

Following step S410, in step S412, the communication device 3 transmits information of the first portion. In one embodiment, the communication device 3 responds with the data size information of each DM message in the first portion to the DM server. In another embodiment, the communication device 3 returns the data number information of each DM message in the first portion to the DM server. The DM server then determines the remaining DM messages to be sent in the resumed transmission according to the information of the first portion. The remaining DM messages comprise the DM messages absent from the first portion to form the complete large data object.

In step S414, the communication device 3 receives the second portion of the large object from the DM server. The DM server may transmit the second portion using the INSERT command that comprises a data segment which is absent in the first portion of the large object, or may transmit a command including an INSERT element. The second portion may be the remaining DM messages, or a part of the DM messages. The communication 3 stores the second portion in the same leaf node as the first portion.

In step S418, the communication device 3 combines the first and second portions upon completion of the transmission of the entire large data object.

In step S420, the telecommunication method 4 is completed and exited.

The communication method 4 handles the large object transmission during device management, thereby providing flexibility of resuming data transmission following termination of a connection.

Referring to FIG. 3, in an embodiment of the present invention, the communication device 3 uses the INSERT command to insert or append data in an object or log file in the MO tree in the memory module 34.

The communication module 32 receives a first data and a first data number from the DM server to be saved in the memory module 34, which comprises the MO tree with a predetermined leaf node to hold the first data and the first data number. The first data may be a management object data, a log file, or other file types compliant with the DM specification.

The communication module 32 then receives the INSERT command (or the command including an INSERT element) comprising a second data and a second data number from the DM server to insert or append the second data after the data in the predetermined leaf node. The second data has an identical data type as the first data, and may be a management object data, a log file, or other file types compliant with the DM specification. The memory module 34 saves the second data and the second data number in the predetermined leaf node, which already contains the first data and the first data number.

The control module 30 then combines the first and the second data according to the first and the second data numbers. The combination operation may be inserting the second data in the first data, or appending the second data after the first one, depending on the order of the data numbers. The first and second data numbers indicate an order to combine the first and the second data. Since the first and the second data have the identical data type, they can be combined according to the order represented by the first and second data numbers. For example, if the first and the second data are data segments of a management object, the control module 30 combines the first and second data to produce a large object. In another example, the first and the second data are log file data, so the control module 30 appends the second data after the first data to generate an updated log file.

As used herein, the term "determining" encompasses calculating, computing, processing, deriving, investigating, looking up (e.g., looking up in a table, a database or another data structure), ascertaining and the like. Also, "determining" may include resolving, selecting, choosing, establishing and the like.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device, discrete gate or transistor logic, discrete hardware components or any combination thereof designed to perform the functions described herein. A general purpose processor may be a microprocessor, but in the alternative, the processor may be any commercially available processor, controller, microcontroller or state machine.

The operations and functions of the various logical blocks, modules, and circuits described herein may be implemented in circuit hardware or embedded software codes that can be accessed and executed by a processor.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the invention shall be defined and protected by the following claims and their equivalents.

What is claimed is:

1. A method for handling large objects, comprising the following steps performed by a telecommunication device:

receiving a first portion of a data object exceeding a predetermined data size from a device management server;

storing the first portion of the data object in a management object leaf node;

determining termination of the reception of the data object prior to the data object being completely received;

holding the first portion of the data object in the management object leaf node after the termination has been determined;

after the termination of the reception of the data object, receiving, from the device management server, an INSERT command or a command including an INSERT element, which comprises a second portion of the data object, for requesting the telecommunication device to insert the second portion of the data object into the management object leaf node, the second portion of the data object being different from the first portion of the data object;

storing the second portion of the data object in the management object leaf node; and combining the first portion of the data object and the second portion of the data object when the data object has been completely received, wherein the first portion of the data object and the second portion of the data object respectively comprise at least one unit data, and each unit data has a data size less than or equal to the predetermined data size.

2. The method of claim 1, further comprising:
receiving a GET command from the device management server to get the data size of the first portion of the data object; and
transmitting the data size of the first portion of the data object to the device management server.

3. The method of claim 1, wherein said each unit data comprises a data number indicating an order of said each unit data in the data object, and the method further comprising saving the data number of said each unit data of the first portion and of the second portion of the data object.

4. The method of claim 3, further comprising:
combining a first unit data and a second unit data according to a data number of the first unit data and a data number of the second unit data.

5. The method of claim 1, wherein said each unit data comprises a data number indicating an order of said each unit data in the data object, and the method further comprising:
receiving a GET command from the device management server to get the data number of said each unit data of the first portion of the data object; and
transmitting the data number of said each unit data to the device management server.

6. The method of claim 1, wherein the second portion of the data object comprises at least one unit data successive to the at least one unit data in the first portion of the data object.

7. The method of claim 1, wherein said each unit data comprises a data number indicating an order of said each unit data in the data object; and
the second portion of the data object comprises at least one unit data with the corresponding data number different from the data number in the at least one unit data in the first portion of the data object.

8. A communication device for handling large objects, comprising:
a communication module, configured to receive a first portion of a data object exceeding a predetermined data size from a device management server;
a memory module, coupled to the communication module, comprising a storage device and a management object tree having a management object leaf node, and is configured to store the first portion of the data object in the management object leaf node, and hold the first portion of the data object in the management object leaf node when termination of the reception of the data object is being determined; and
a control module, coupled to the communication module and the memory module, and is configured to determine the determining termination of the reception of the data object prior to the data object being completely received, wherein the communication module is further configured to receive, from the device management server, an INSERT command or a command including an INSERT element, which comprises a second portion of the data object, for requesting the telecommunication device to insert the second portion of the data object into the management object leaf node after the termination of the reception of the data object, the second portion of the data object being different from the first portion of the data object;
the memory module is further configured to store the second portion of the data object in the management object leaf node; and
the control module is further configured to combine the first portion of the data object and the second portion of the data object when the data object has been completely received, wherein the first portion of the data object and the second portion of the data object respectively comprise at least one unit data, and each unit data has a data size less than or equal to the predetermined data size.

9. The communication device of claim 8, wherein: the communication module is further configured to receive a GET command from the device management server to get the data size of the first portion of the data object, and transmit the data size of the first portion of the data object to the device management server.

10. The communication device of claim 8, wherein said each unit data comprises a data number indicating an order of said each unit data in the data object, and the memory module saves the data number of said each unit data of the first portion and of the second portion of the data object.

11. The communication device of claim 10, wherein the control module is further configured to combine a first unit data and a second unit data according to a data number of the first unit data and a data number of the second unit data.

12. The communication device of claim 8, wherein said each unit data comprises a data number indicating an order of said each unit data in the data object, and:
the communication module receives a GET command from the device management server to get the data number of said each unit data of the first portion of the data object; and transmits the data number of said each unit data to the device management server.

13. The communication device of claim 8, wherein:
the second portion of the data object comprises at least one unit data successive to the at least one unit data in the first portion of the data object.

14. The communication device of claim 8, wherein said each unit data comprises a data number indicating an order of said each unit data in the data object, and:
the second portion of the data object comprises at least one unit data with the corresponding data number complementing to the data number in the at least one unit data in the first portion of the data object.

* * * * *